(12) United States Patent
Degertekin et al.

(10) Patent No.: US 7,068,377 B2
(45) Date of Patent: Jun. 27, 2006

(54) SYSTEM AND METHOD FOR SURFACE PROFILING A TARGET OBJECT

(75) Inventors: Fahrettin L. Degertekin, Decatur, GA (US); Thomas R. Kurfess, Marietta, GA (US); Byungki Kim, Alpharetta, GA (US); Hosein Ali Razavi, Decatur, GA (US)

(73) Assignee: Georgia-Tech Rsearch Corporation, Atlanta, GA (US)

( * ) Notice: Subject to any disclaimer, the term of this patent is extended or adjusted under 35 U.S.C. 154(b) by 432 days.

(21) Appl. No.: 10/113,362

(22) Filed: Mar. 29, 2002

(65) Prior Publication Data

US 2003/0184761 A1 Oct. 2, 2003
US 2006/0098208 A9 Oct. 2, 2003

(51) Int. Cl.
*G01B 9/02* (2006.01)

(52) U.S. Cl. ........................................ 356/511; 356/521
(58) Field of Classification Search ................ 356/511, 356/512, 513, 514, 521
See application file for complete search history.

(56) References Cited

U.S. PATENT DOCUMENTS

| | | | |
|---|---|---|---|
| 4,188,124 A * | 2/1980 | Jaerisch et al. ............. | 356/512 |
| 4,955,718 A | 9/1990 | Michel | |
| 5,047,633 A | 9/1991 | Finlan et al. ............... | 250/306 |
| 5,247,186 A | 9/1993 | Toda .......................... | 250/561 |
| 5,253,515 A | 10/1993 | Toda et al. .................... | 73/105 |
| 5,402,234 A | 3/1995 | Deck | |
| 5,445,011 A | 8/1995 | Ghislain et al. ............. | 73/105 |
| 5,526,116 A * | 6/1996 | de Groot .................... | 356/512 |
| 5,565,987 A * | 10/1996 | Jain et al. ................... | 356/501 |
| 5,900,729 A | 5/1999 | Moser et al. ............... | 324/244 |
| 5,908,981 A | 6/1999 | Atalar et al. | |

(Continued)

FOREIGN PATENT DOCUMENTS

| | | |
|---|---|---|
| JP | 05248810 | 9/1992 |
| JP | 07065428 | 3/1995 |
| JP | 10073608 | 3/1998 |
| JP | 10090287 | 4/1998 |
| JP | 200493574 | 3/2004 |

OTHER PUBLICATIONS

Zygo Corporation, "Zygo Corporation's New View 5000; Precise, Rapid, Noncontact 3D Surface Profiling," Apr. 2001.

(Continued)

*Primary Examiner*—Samuel A. Turner
(74) *Attorney, Agent, or Firm*—Thomas, Kayden, Horstemeyer & Risley, LLP (57) ABSTRACT

The present invention relates to microinterferometers and the application of such to profile surface geometries. A representative method for profiling a target surface of an object includes: illuminating the target surface with an incident light beam through a phase-sensitive, reflective diffraction grating, such that a first portion of the incident light beam is reflected and a second portion of the incident light beam is diffracted upon being transmitted through the diffraction grating; receiving interference patterns produced from the first portion of he incident light beam reflected from the diffraction grating interfering with the second portion of the incident light beam reflected from the target surface; measuring the intensity of the interference patterns to determine the distance to determine the distance between a reference point and the surface; varying the position of the object relative to the diffraction grating; and processing the measured distances to profile the surface of the object. Systems are also provided.

20 Claims, 5 Drawing Sheets

U.S. PATENT DOCUMENTS

| | | | |
|---|---|---|---|
| 5,923,033 A | 7/1999 | Takayama et al. | 250/234 |
| 5,952,657 A | 9/1999 | Alexander et al. | 250/306 |
| 6,028,305 A | 2/2000 | Minne et al. | 250/234 |
| 6,181,097 B1 | 1/2001 | Li et al. | 318/592 |
| 6,196,061 B1 | 3/2001 | Adderton et al. | 73/105 |
| 6,247,747 B1 | 6/2001 | Kawanomoto et al. | 296/191 |
| 6,251,755 B1 | 6/2001 | Furukawa et al. | 438/510 |
| 6,272,907 B1 | 8/2001 | Neukermans et al. | 73/105 |
| 6,279,389 B1 | 8/2001 | Adderton et al. | 73/105 |
| 6,291,927 B1 | 9/2001 | Percin et al. | 310/324 |
| 6,400,166 B1 | 6/2002 | Babson et al. | 324/754 |
| 6,445,109 B1 | 9/2002 | Percin et al. | 310/324 |
| 6,523,392 B1 | 2/2003 | Porter et al. | 73/24.01 |
| 6,567,572 B1 | 5/2003 | Degertekin et al. | 385/12 |
| 6,672,144 B1 | 1/2004 | Adderton et al. | 73/105 |
| 6,678,813 B1 | 1/2004 | Le | 711/172 |
| 6,684,686 B1 | 2/2004 | Itsuji et al. | 73/105 |
| 6,827,979 B1 | 12/2004 | Mirkin et al. | 427/256 |
| 6,836,112 B1 | 12/2004 | Hennessy | 324/300 |
| 6,862,923 B1 | 3/2005 | Buguin et al. | 73/105 |
| 6,862,924 B1 | 3/2005 | Xi et al. | 73/105 |
| 6,882,429 B1 | 4/2005 | Weitekamp et al. | 356/482 |
| 6,884,981 B1 | 4/2005 | Proksch et al. | 250/201.3 |
| 2001/0000279 A1 | 4/2001 | Daniels et al. | 73/105 |
| 2001/0013574 A1 | 8/2001 | Warren et al. | 250/234 |
| 2001/0035700 A1 | 11/2001 | Percin et al. | 310/324 |
| 2001/0049959 A1 | 12/2001 | Neukermans et al. | 73/104 |
| 2002/0039463 A1 | 4/2002 | Degertekin et al. | |
| 2002/0163648 A1 * | 11/2002 | Degertekin et al. | 356/511 |
| 2003/0033863 A1 | 2/2003 | Ashby et al. | 73/105 |
| 2003/0042409 A1 | 3/2003 | Warren et al. | 250/234 |
| 2003/0047675 A1 | 3/2003 | Proksch et al. | 250/234 |
| 2003/0200798 A1 | 10/2003 | Lindig et al. | 73/105 |
| 2004/0065821 A1 | 4/2004 | Warren et al. | 250/234 |
| 2004/0127025 A1 | 7/2004 | Crocker, Jr. et al. | 438/677 |
| 2004/0129063 A1 | 7/2004 | Balooch et al. | 73/105 |
| 2004/0154367 A1 | 8/2004 | Oumi et al. | 72/325 |
| 2004/0206165 A1 | 10/2004 | Minne et al. | 73/105 |
| 2004/0216517 A1 | 11/2004 | Xi et al. | 73/105 |
| 2005/0013230 A1 | 1/2005 | Adelman | 369/101 |
| 2005/0017173 A1 | 1/2005 | Kumar | 250/306 |
| 2005/0048651 A1 | 3/2005 | Ryttsen et al. | 435/459 |
| 2005/0066714 A1 | 3/2005 | Adderton et al. | 73/105 |
| 2005/0145021 A1 | 7/2005 | Chand et al. | 73/105 |
| 2005/0180678 A1 | 8/2005 | Panepucci et al. | 385/13 |
| 2005/0181132 A1 | 8/2005 | Mirkin et al. | 427/256 |

OTHER PUBLICATIONS

Cooper et al., "High–resolution micromachined interferometric accelerometer," Applied Physics Letters, vol. 27, No. 22, May 29, 2000, pp. 3316–3318.

Manalis, et al., "Interdigital Cantilevers for atomic force microscopy," Applied Physics Letters, vol. 65, No. 25, Dec. 16, 1996, pp. 3944–3946.

Yaralioglu et al., "Analsis and design of an interdigital cantilever as a displacement sensor," Journal of Applied Physics, vol. 83, No. 12, Jun. 15, 1998, pp. 74057415.

Chen et al., "Overview of three–dimensional shape measurement using optical methods," Opt. Eng. 39(1), 10–22, Jan. 2000.

DeWitt et al., "Range–finding method using diffraction gratings," Applied Optics, vol. 34, No. 14, May 10, 1995, pp. 2510–2521.

Solgaard et al., "Deformable grating optical modulator," Optics Letters, vol. 17, No. 9, May 1, 1992, pp. 688–690.

Ming C. Wu, "Micromachining for Optical and Optoelectronic Systems," Proceedings of the IEEE, vol. 85, No. 11, Nov. 1997, pp. 1833–1856.

* cited by examiner

SYSTEM AND METHOD FOR SURFACE PROFILING A TARGET OBJECT

CROSS-REFERENCE TO RELATED APPLICATION

This application claims priority to the following co-pending U.S. provisional applications: a) "Micro-Interferometer for High Precision, High-Speed Flatness Measurement," having Ser. No. 60/356,942, filed Feb. 13, 2002 with U.S. Express Mail Label #EL-894720646-US; b) "Micro-Interferometers with Sensitivity Optimization and Self Calibration Capability," having Ser. No. 60/356,960, filed Feb. 13, 2002, with U.S. Express Mail Package No. EL-894720650-US; and c) "Micro-Interferometer for Accurate Absolute Distance Measurements," having Ser. No. 60/279,575, filed Mar. 29, 2001, which are all incorporated by reference herein in their entirety.

This application is also related to the following co-pending U.S utility patent applications: a) "Microinterferometers with Performance Optimization," having Ser. No. 10/112,490, filed Mar. 29, 2002, with U.S. Express Mail Package No. EL-924223979-US; and b) "Microinterferometers for Distance Measurements," having Ser. No 10/109,754 filed Mar. 29, 2002, with U.S. Express Mail Package No. EL-924223982-US, which are all incorporated by reference herein in their entirety.

FIELD OF THE INVENTION

The present invention generally relates to measurement devices. More specifically, the invention relates to surface geometry measurement devices such as interferometers.

DESCRIPTION OF THE RELATED ART

In many fields, surface metrology is critical to process control and quality. Semiconductor fabrication, micromachining, data storage, biomedical, and materials research are technology fields that may require surface metrology. In particular, surface geometrical characteristics, flatness of an object surface, and surface finish are important measurements that are typically made. Such measurements typically require relatively high precision. Unfortunately, the tradeoff to high precision is usually low speed in measuring and processing due to bulky equipment and data overload.

Presently, there are a wide variety of surface measurement systems, such as profilometers. Most systems make use of contact probes that employ Linear Variable Differential Transformers (LVDTs) and/or capacitance gages. Contact with the surface under test is not always desirable, as unwanted side effects, such as damaging the test surface can occur.

Another type of surface measurement system is the Zygo® Corporation's New View 5000™, which utilizes fringing interferometry and vision systems to measure the flatness of a surface and its roughness. Although the New View 5000 is non-contacting, there are other drawbacks. The New View 5000 utilizes a charge-coupled device (CCD) camera and fringing interferometry which can be quite slow because of an abundance of collected data and the relatively low sampling speed of the CCD camera.

In general, optical interferometry is the act of splitting and recombining electromagnetic waves, in particular, visible light waves, to measure surface geometries, distance, etc. The advancement in interferometry has come in many avenues of technology. Long-range telescopes, high-precision spectrometers, compact disc players, etc., use some form of interferometry. Micro-machinery is a growing technology field that often utilizes interferometers because, they typically have high resolution and precision. In general, displacement measurements in the sub-nanometer range can be detected with today's interferometers. To examine microscale structures, the lateral resolution of the interferometers, generally, need to be improved. This can be achieved by coupling the interferometer to a regular microscope. Unfortunately, the size of the interferometer becomes rather large and subsequently may not fit in small spaces for inspection. Furthermore, to inspect a large number of microscale structures either the sample or microscope objective is scanned, resulting in slow imaging.

In order to obtain interferometric measurement sensitivity in a small volume, several methods have been developed. One of these methods involves phase sensitive diffraction gratings as described in a technical paper entitled, "Interdigital cantilevers for atomic force microscopy," published in *Appl. Phys. Lett.*, 69, pp. 3944–6, Dec. 16, 1996 by S. R. Manalis, S. C. Minne, A. Atalar, and C. F Quate and also in U.S. Pat. No. 5,908,981 to Atalar et al.

Similar structures are also used in microaccelerometers to measure the displacement of a control mass with interferometric precision as described in a paper written by E. B. Cooper, E. R. Post, and S. Griffith and entitled "High-resolution micromachined interferometric accelerometer," Appl. Phys. Lett., 76 (22), pp. 3316–3318, May 29, 2000. It should be noted, however, that these papers discuss measuring relative distance of the object with respect to the reference gratings.

Two well known uses for microinterferometers are range finding and shape measurement, of which there are several optical range finding and shape measurement methods. Traditional range finding using focus analysis is an effective method, but for high accuracy and reduced depth of field, the lenses are typically large. Hence, mechanical scanning to make shape measurement becomes a slow and difficult task. Microscopes can be used to enhance the resolution, but this comes at the cost of extremely short standoff distances from the object, making scanning difficult. Interferometric ranging methods are very accurate, but in ordinary implementations, the methods operate in a relative coordinate space and can be problematic when the object surfaces have abrupt discontinuities.

It would be desirable to have a microinterferometer that can determine an absolute distance as well as relative distance, as opposed to most of today's microinterferometers which can determine only relative distance. It would also be desirable to increase the resolution and sensitivity of the microinterferometer, while keeping the microinterferometer relatively fast enabling measurement of the dynamic response of the microstructures under investigation.

At some point, the sensitivity, and thus the resolution of the microinterferometer can be improved only so much. Like most transmission/receiving systems, this occurs when miniscule differences in the signal can not be detected because of the noise in the system. Once the signal strength, in this case the intensity of the light and the lateral resolution, has been improved to its known limit, generally, the next step is to reduce the noise floor. This, similar to increasing the strength of the signal, increases the signal-to-noise ratio (SNR). In optical systems such as interferometers several noise sources exist. For example, noise caused by the emitting light source, shot noise in the receiving element, electrical noise from backend electrical components, and overall system noise, such as mechanical and thermal noise. It would be desirable to have a microinterferometer that can overcome and/or reduce some or all of the noise in the system. As mentioned, this can increase the SNR and thus improve the overall resolution and performance of the microinterferometer.

Based on the foregoing, it should be appreciated that there is a need for improved flatness measurement systems, particularly those that utilize interferometry, that address the aforementioned problems and/or other shortcomings of the prior art.

SUMMARY OF THE INVENTION

The present invention relates to surface profiling and microinterferometers. In this regard, one embodiment of the invention, among others, is a system for profiling a surface of an object. The system includes an optical sensor comprising an optical microinterferometer positioned about the surface for measuring the distance between a reference point of the optical microinterferometer and the surface and means for varying the position of the object relative to the optical microinterferometer.

Methods for profiling a target surface of an object are also provided. One such method, among others, is practiced by the following steps: illuminating the target surface with an incident light beam through a phase-sensitive, reflective diffraction grating, such that a first portion of the incident light beam is reflected and a second portion of the incident light beam is diffracted upon being transmitted through the diffraction grating; receiving interference patterns produced from the first portion of the incident light beam reflected from the diffraction grating interfering with the second portion of the incident light beam reflected from the target surface; measuring the intensity of the interference patterns to determine the distance between a reference point and the surface; varying the position of the object relative to the diffraction grating; and processing the measured distances to profile the surface of the object.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in greater detail herein, embodiments of the present invention can profile a target surface and, in particular, make surface geometry measurements, such as flatness, that can be made with one and/or an array of microinterferometers. The surface profiling system disclosed can provide for high-precision, high-speed surface topology measurements, such as surface flatness, roughness, waviness, and form, by utilizing non-contacting optical interferometry.

Figure 1:
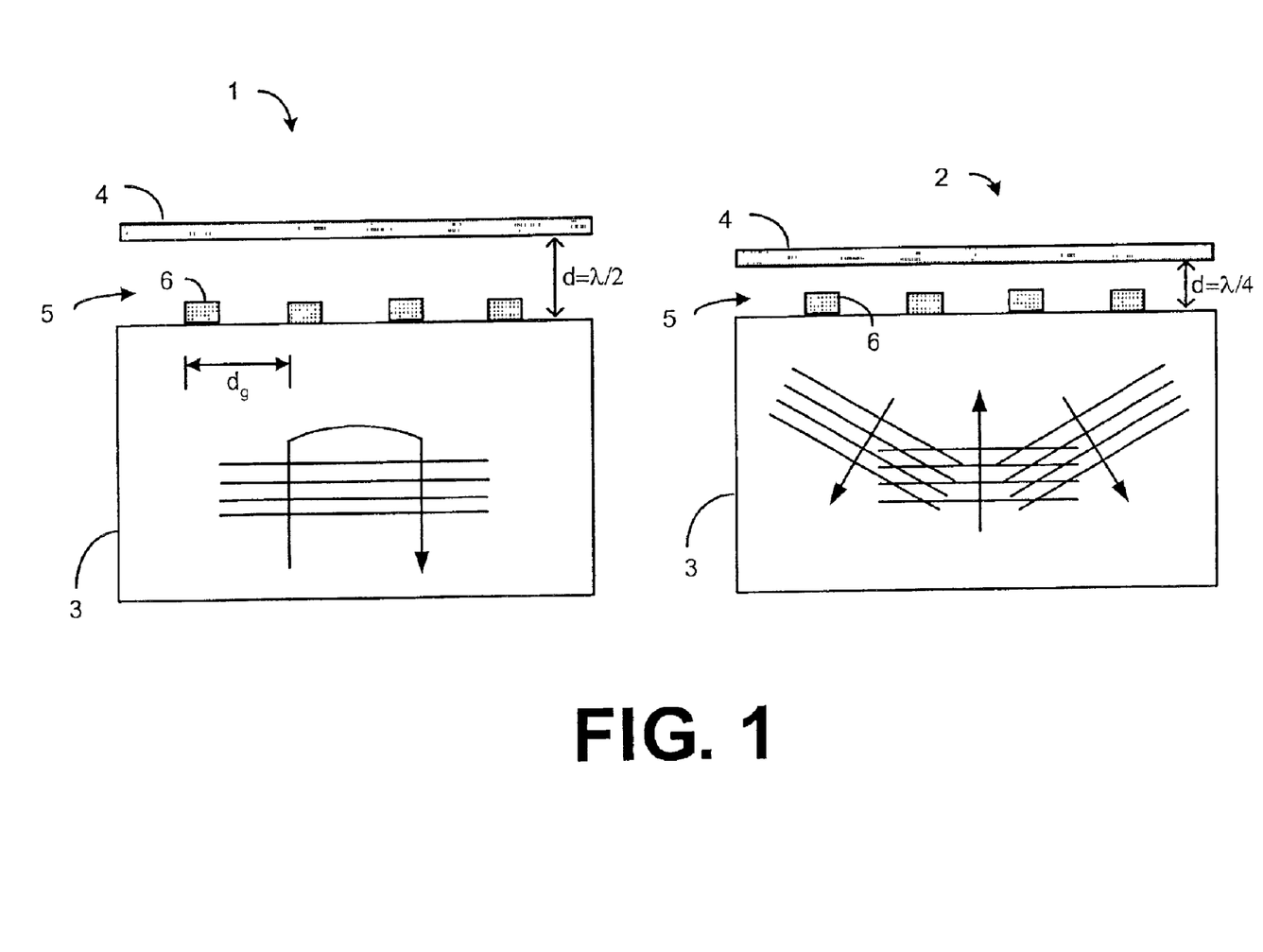
FIG. 1 is a diagram illustrating the concept of using a diffraction grating to split beams in an interferometer.

Referring now in more detail to the drawings, FIG. 1 is a diagram illustrating the concept of using a diffraction grating to split beams in a microinterferometer. This concept has been utilized in measuring precise relative displacements, such as for the measurement of Atomic Force Microscopy (AFM) tip displacement and in spatial light modulators, as in the grating light valves (GLV). This concept is also disclosed in co-pending U.S. Patent Application to F. L. Degertekin, G. G. Yaralioglv, and B. Khuri-Yakub, having Ser. No. (unknown), filed Jun. 28, 2001 with U.S. Express Mail Label No. ET-583617335-US and claiming priority to U.S. Provisional Patent Application Ser. No. 60/214,884. AFM, in general, is a technique for analyzing the surface of a rigid material at the atomic level. AFM uses a mechanical probe to magnify surface features up to 100,000,000 times, and it can produce 3-D images of the surface. In general, a GLV contains several tiny reflective ribbons that are mounted over a silicon chip with a tiny air gap in between the chip and the ribbons. When a voltage is applied to the chip below a particular ribbon, that ribbon bends toward the chip by a fraction of a wavelength of an illuminating light. The deformed ribbons collectively form a diffraction grating and the various orders of the light can be combined to form the pixel of an image. The shape of the ribbons, and therefore the image information, can be changed in as little as 20 billionths of a second.

The diagram of FIG. 1 illustrates two scenarios. A first scenario 1 shows what occurs when a target surface 4 is placed a distance of a half-wavelength, $\lambda/2$, away from a reference point, in this case, a reflective diffraction grating 5. A second scenario 2 shows what occurs when the target surface 4 is placed a distance of a quarter-wavelength, $\lambda/4$, away from the diffraction grating 5. The detailed diffraction pattern of such a structure can be found by applying standard diffraction theory to determine the locations and the dimensions of the photo-detectors or light guide apertures.

In both instances, the reflective diffraction grating 5 is formed on a transparent substrate 3. Exemplary materials that may be utilized to construct such elements will be discussed in further detail in relation to FIG. 4. The diffraction grating 5 is formed of an array of diffraction grating fingers 6 equally spaced along a front edge of the transparent substrate 3. It should be noted that, as mentioned above, this diagram is not to scale, and is merely for illustrative purposes. In reality, the diffraction grating fingers 6 would typically have a height on the order of micro- or nanometers.

In the first scenario 1, when an incident light is illuminated through the transparent substrate 3, a first portion of the incident light is reflected from the reflective diffraction grating 5. A second portion of the incident light is transmitted and diffracted about the diffraction grating fingers 6. The transmitted and diffracted light reflects off of the target surface 4 and is measured by a proper detection unit (not shown), such as a photo-detector or a photo-diode. As in scenario 1, the target surface is placed at a distance of λ/2 or any integer multiple, thereof. In this case, the $0^{th}$ order of the transmitted incident light is reflected back. In general, the $0^{th}$ order is the transmitted light that is illuminated directly, in which case no diffraction, or change in direction occurs. The first portion of the incident light, and the second portion of the incident light which has been reflected off of the target surface 4 interferes with each other. The phase of the two portions of the light waves help form constructive and destructive interference patterns. From the interference patterns, the relative distance between the diffraction grating 5 and the target surface 4 can be determined.

In scenario 2, the same general structure is set up. In this case, the target surface 4 is placed a distance of λ/4 away from the diffraction grating 5. In practice, the target surface 4 may be placed at any integer multiple of λ/4 and the same general results will occur. When the first portion of the incident light joins with the second portion of the incident light upon reflection, destructive interference cancels out the two. The second portion of the light travels an extra distance of 2× the distance between the target surface 4 and the diffraction grating 3, which results in a phase difference between the two portions of π, complete destructive interference. On the contrary though, the higher order diffraction fields, such as the first order, can constructively interfere with the first portion of the incident light. As FIG. 1 illustrates, the higher order first and second portions of the incident light are angled and not parallel to the line of illumination, like the $0^{th}$ order beam.

Figure 2:
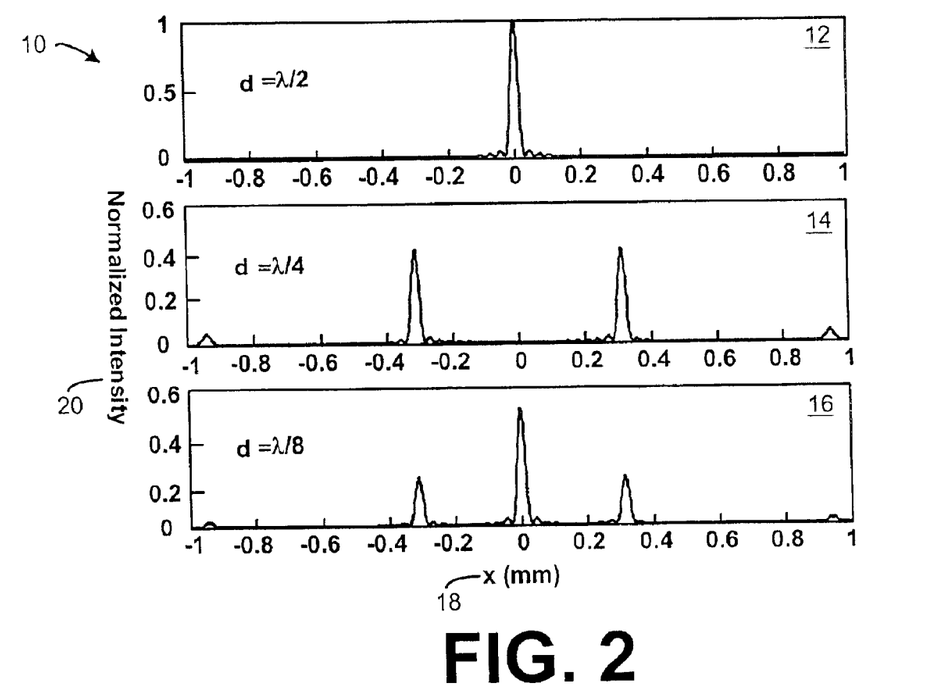
FIG. 2 is a graph illustrating the distribution of reflected light measured on an observation plane with various gap thicknesses utilizing the method described in FIG. 1.

Having described an example of using a diffraction grating to split light beams and therefore measure relative distance, theoretical calculations will be utilized to show the results of using the method illustrated in FIG. 1. Suppose an incident light of λ=632 nm is illuminated through the transparent substrate 3 onto the reflective diffraction grating 5. A laser can be utilized to provide the incident light. In this case, a helium-neon (HeNe) laser can be utilized. Suppose the diffraction grating 5 contains 10 diffraction grating fingers 6 equally spaced at $d_g$=2 µm. FIG. 2 is a graph 10 illustrating the distribution of reflected light measured on an observation plane with various gap thicknesses utilizing the method illustrated in FIG. 1. Hereinafter, the distance between a reference point, in this case the diffraction grating 5, and the target surface 4 will be referred to as the gap thickness and can be considered the absolute distance to the surface.

FIG. 2 shows the normalized intensity of reflected light 20 versus an observation length, ×18. The observation length, x, is in the lateral direction, and centered at the $0^{th}$ order beam. In this case, a 100 µm wide photo-detector has been used. Three scenarios are shown in the graph 10. Scenario 12 shows the normalized intensity 20 with gap thickness, d=λ/2. Scenario 14 shows the normalized intensity 20 with gap thickness, d=λ/4. Scenario 16 shows the normalized intensity 20 with gap thickness, d=λ/8.

As expected, scenario 12 shows the $0^{th}$ order reflected beam with complete constructive interference. The higher order beams, e.g. the $1^{st}$ and $3^{rd}$ order beams incur destructive interference and so their intensity is cancelled out. Scenario 14 shows that the $0^{th}$ order has been completely cancelled out and the $1^{st}$ and the $3^{rd}$ orders of the reflected beam appear to have partial intensity. Scenario 16 shows that when the gap thickness, d=λ/8, both the $0^{th}$ order and the $1^{st}$ order contain some light intensity. Perhaps, most importantly, graph 10 attempts to show the periodic nature of the intensity of the orders of the reflected light versus varying gap thickness.

Figure 3:
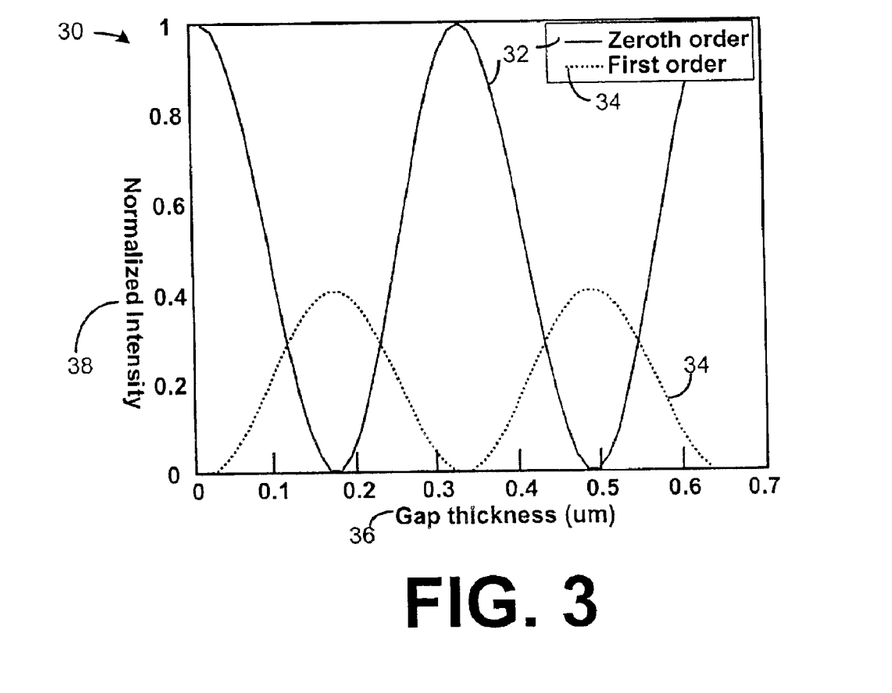
FIG. 3 is a graph illustrating the normalized intensity of various diffraction orders vs. gap thickness utilizing the method described in FIG. 1.

The intensity of these orders as a function of grating-reflecting surface shows the $\cos^2(2\pi d/\lambda)$ and $\sin^2(2\pi d/\lambda)$ variation, as illustrated in FIG. 3. FIG. 3 is a graph 30 illustrating the normalized intensity 38 of various diffraction orders 32 and 34 versus gap thickness 36 utilizing the method described in FIG. 1.

As shown in FIG. 3, the $0^{th}$ order curve 32 takes on a $\cos^2(2\pi d/\lambda)$ shape. This is in line with the results found in FIG. 2. At gap thickness of λ/2, which is approximately 0.316 µm, the intensity is greatest. At gap thickness of λ/4, which is approximately 0.158 µm, the intensity is zero. The $1^{st}$ order curve 34 takes on a $\sin^2(2\pi d/\lambda)$ shape. The graph 30 of FIG. 3 clearly displays the periodic nature of the diffraction orders. As one can see, keeping all other variables constant and known, one can calculate the relative distance by measuring the intensity of the orders, in particular the $1^{st}$ order. In fact, by monitoring the intensity of any of the reflected orders, one can achieve interferometric resolution on the order of $1 \times 10^{-5}$ Å/√Hz.

Unfortunately, due to the periodic nature of intensity curves, absolute distance cannot be determined, only relative distance. For example, one cannot conclude whether the gap thickness is λ/4 or 3λ/4. In the discussion that follows, several embodiments will be described that may solve this potential problem. To that, the presented solution also helps to improve the lateral resolution and overall sensitivity of the microinterferometer.

Figure 4:
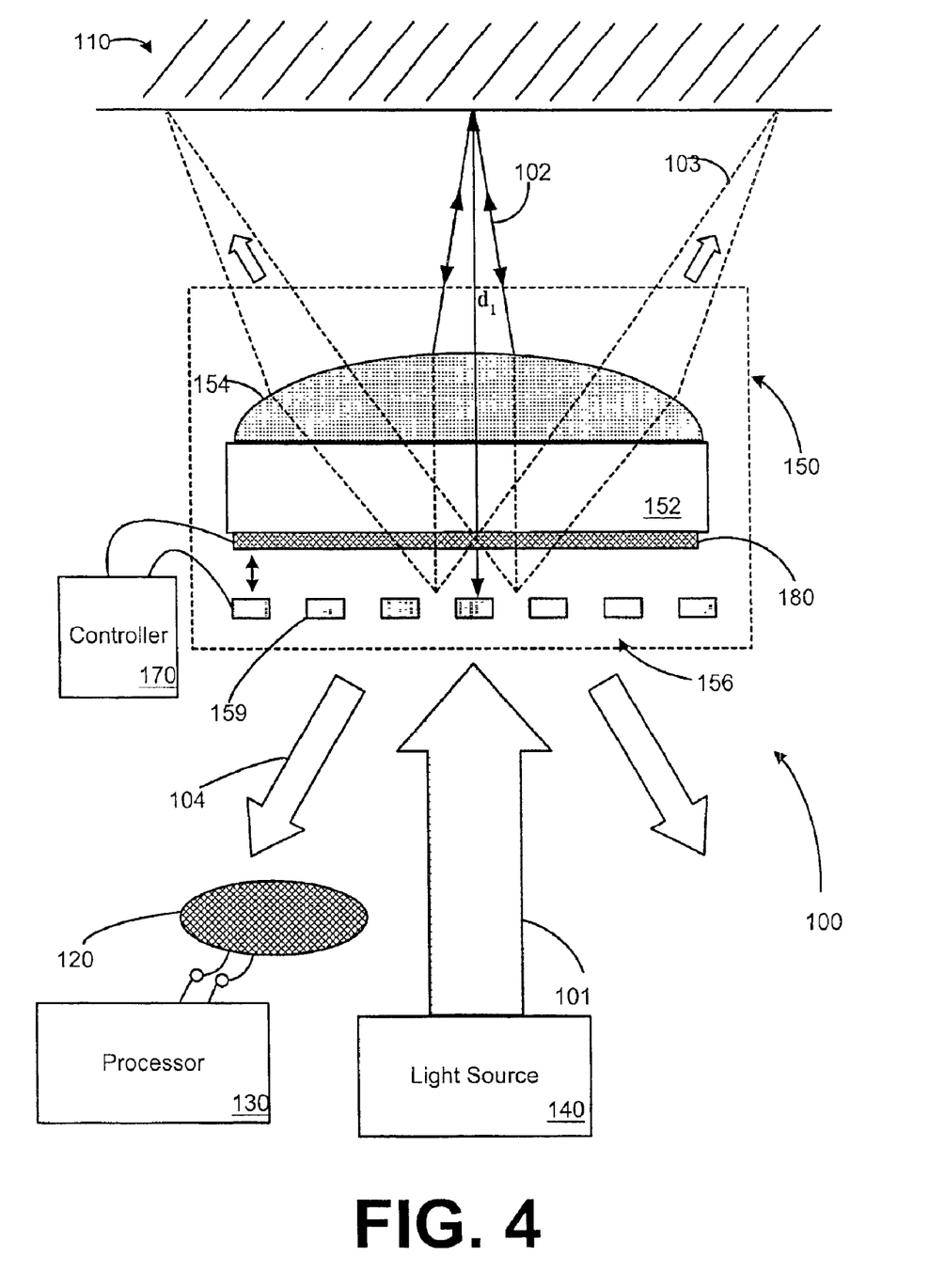
FIG. 4 is a diagram illustrating an embodiment of a microinterferometer utilized in accordance with the present invention.

FIG. 4 is a diagram illustrating an embodiment of a microinterferometer 100 in accordance with the present invention. Included in the microinterferometer 100 is a light source 140 that provides the incident light. The microinterferometer 100 also includes a tunable diffracting micro-objective 150. Included within the tunable diffracting micro-objective 150 is a substantially transparent substrate 152, a tunable phase-sensitive diffraction grating 156 formed below the transparent substrate 152, and a lens 154 formed on the transparent substrate 152. An electrode 180 is also included in the tunable diffracting micro-objective 150 and formed on the substrate 152 and positioned orthogonal to the diffraction grating 156 such that a portion of the electrode 180 is below each finger 159 of the diffraction grating 156. A photo-detector 120 is also included in the microinterferometer 100 to receive the reflected light. Electrically coupled to the photo-detector 120 is a processor 130, which may be configured to process the received signals and therefore make appropriately desired calculations. In operation, a target surface 110 would be positioned at an unknown distance from a known reference point of the microinterferometer 100, and preferably normal to the direction of the incident light.

In this embodiment, a controller 170 is coupled to the electrode 180 and to the diffraction grating 156. By providing a voltage potential across the electrode 180 and the diffraction grating 156, the controller 170 can electrostatically actuate the diffraction grating 156.

The light source 140, in this embodiment, may be a laser, that emits an electromagnetic wave at a known wavelength, λ. An emitted incident light beam 101 would be illuminated onto the reflective diffraction grating 156. In this embodiment, a Helium-Neon (HeNe) laser ($\lambda$=632 nm) may be utilized. In other embodiments, the light source 140 may be a laser emitting another known wavelength. The exact wavelength of the incident light beam 101 may vary as long as the dimensions of the components of the microinterferometer 100 are calculated in terms of the incident light beam 101 wavelength. To that, light sources emitting more than one known wavelength can be utilized as well, although, preferably, a light source emitting one known wavelength would be utilized. In practice, any kind of temporarily coherent light source with a coherence length equal to or greater than two times the distance between the target surface 110 and the diffraction grating 156 may be utilized.

In other embodiments, the incident light beam 101 may be carried via an optical fiber, in which case the light source 140 may be located remotely. As depicted in FIG. 4, the light source is positioned normal to the plane of the transparent substrate 152. Utilizing an optical fiber adds flexibility in placing the light source 140.

In yet other embodiments, the incident light beam 101 may be guided towards the diffraction grating 156 via a wave guide and/or a set of properly placed mirrors. For instance, the light source 140 may be placed relatively parallel to the lengthwise direction of the transparent substrate 152. In this case, a mirror and/or a wave guide can change the direction of the incident light beam 101 so that it is illuminated at a direction normal to the diffraction grating 156. To that, although it appears that the best results occur when the incident light beam 101 is illuminated at a direction normal to the diffraction grating 156, it need not be necessary.

The transparent substrate 152 is typically a planar surface, although not necessarily. For example, the substrate 152 may be cut so as to have a rounded surface for the forming the diffraction grating 156. This may aid in focusing the incident light beam 101. A variety of materials can be utilized for the substrate 152. Non-limiting examples are quartz, silicon, sapphire, glass, and combinations thereof. In other embodiments, the substrate 152 may be non-transparent, but a bulk-etched cavity may be incorporated into the substrate 152 to allow illumination. In general, the transmission coefficient, $\tau$, of the transparent substrate 152 for a given wavelength of incident light beam 101 may be larger than 0.9. The dimensions of the transparent substrate 152 can vary according to the overall structure of the microinterferometer 100, but in general, the lateral thickness of the substrate 152 may be in the range of 0.1 mm–2 mm, and likewise having a working distance of 0.1 mm–2 mm with an F-number from 1 to 5. The lateral length can vary with the structure of the microinterferometer 100. To ease in manufacturing, it may be necessary for the lateral length of the substrate 152 to be sufficiently longer than the width of the lens 154.

In other embodiments, the transparent substrate 152 may be configured, upon manufacture, to assist in focusing the diffracted and/or collimated incident light beams. In other embodiments, the lens 154 may be cut out of the substrate 152, so that the lens 154 would be fully integrated into the substrate 152.

As mentioned, the diffraction grating 156 may include several equally spaced fingers 159. In general, the spatial separation between adjacent fingers may be on the order of the wavelength of the incident light beam 101. The fingers 159 may be constructed of a reflective and conductive material that has a reflection coefficient of between 0.8 to 1.

The conductivity of the diffraction grating fingers may be necessary for electrostatic actuation of the fingers 159. In general, the fingers 159 may be shaped as blocks and could be composed of a conductive material with a non-dielectric reflective coating. In other embodiments, the fingers 159 may be composed of a dielectric material and be coated with a conductive reflective material. The dimensions of the fingers 159 can vary greatly with the wavelength of the incident light beam 101. In this embodiment, however, the dimensions of the fingers 159 may be on the order of the wavelength of the incident light beam 101, or about 0.5 µm to 10 µm. Several fingers 159 (on the order of 10$\lambda$ in lateral length) may make up the diffraction grating 156. In this embodiment, the diffraction grating 156 is formed atop the front planar surface of the transparent substrate 152. In other embodiments, the diffraction grating 156 may be formed on the rear planar surface of the transparent substrate 152. In this case, the lens 154 may be removed so that only relative distance would be measured.

The diffraction grating fingers 159 need not be equally spaced. The diffraction grating 156 may be configured to focus the incident light beam 101 on a given focal point. This may be accomplished by varying the spacing between the fingers 159 in such a way so as to focus the light.

The electrode 180 is placed in relation to the diffraction grating fingers 159. In general, the electrode 180 is a conductive material that is deposited onto the substrate 152 and orthogonal to the fingers 159, and positioned off-center so as not to obstruct the transmission of the light. Similar to the diffraction grating fingers 159, the electrode 180 may be a dielectric material covered with a conductive coating. In practice, when a voltage, either DC or AC or both is applied across the electrode 180 and the fingers 159, the fingers 159 would bend toward the electrode 180 in such a way so as to deform the diffraction grating 156. In other embodiments, more than one electrode 180 may exist. The electrodes 180 may be configured upon manufacture so as to keep the diffraction grating fingers 159 substantially parallel to the substrate 152 upon actuation.

The lens 154 may be of a different material than the substrate 152 and so would be formed on the rear planar surface of the substrate 152. In general, the lens 154 may be a planar convex lens with a transmission coefficient of between 0.7 and 1. A non-limiting example of lenses 154 that can be utilized are a binary Fresnel lens or any lens with two or more phase steps. The lateral length of the lens 154 may be between 50 µm–500 µm. The thickness of the lens 154 may be up to 50 µm, but generally, can greatly vary depending on how it is constructed. In other embodiments, as mentioned earlier, the substrate 152 may be formed in such a way that a separate lens 154 may not be necessary. The function of the lens 154 can be incorporated into the substrate 152. In practice, the lens 154 provides for focal depth that helps determine absolute distance. In other embodiments, the absence of the lens 154 may eliminate the possibility of absolute distance measurements. In which case, only accurate relative distance measurements may be made.

The microinterferometer 100 also includes a photo-detector 120. In this embodiment, the photo-detector 120 may be placed parallel and in front of the substrate 152. As the figure depicts, the photo-detector 120 may be positioned to receive a higher diffraction order of the reflected light, such as the $1^{st}$ or $3^{rd}$ order. The observation length, x, can vary, but should be properly positioned so that a higher diffraction order may be observed. For example, the observation length x, may vary with the wavelength of the incident light beam 101. The photo-detector may be placed at an optimal longitudinal distance, e.g. 300 µm, but this may vary with wavelength.

In other embodiments, the photo-detector 120 may be remotely located and the diffracted light may be received via an appropriately placed optical fiber. In yet other embodiments, a wave guide and/or mirrors may change the direction of the diffracted and reflected beams. In this embodiment, as mentioned, the photo-detector 120 is placed parallel to the substrate 152. This allows for a relatively small space, on the order of 100 µm–1000 µm.

Several photo-detectors 120 are known in the art. In general, any photo-detector 120 that can be configured for micromachining and can sustain the desired bandwidth can be utilized. One specific example of a photo-detector 120 that can be used is a silicon P-N junction photodiode. Another type that could be utilized is a P-I-N type photodiode. The utilized photo-detector 120 may depend on the processing speed and responsivity (photocurrent per Watt of incident light) requirements. For example, at wavelengths where the absorption of silicon is small, deeper junction depths may be required to increase responsivity.

Similarly, the geometry of the photo-detector 120 may be adjusted to minimize its capacitance and transit time to increase the detection bandwidth. Some signal conditioning circuitry, such as a transimpedance amplifier, may also be implemented on the same semiconductor substrate as the photo-detector 120 to minimize noise and decrease parasitic capacitance. These photo-detectors 120 with integrated electronics can be configured to operate with bandwidths from DC to GHz range for sensing optical communication applications.

A processor 130 may be included within the microinterferometer 100, but more than likely will be communicatively coupled to the microinterferometer 100 and be an external component. The processor 130 may be any type of electrical components that can process the signals received by the photo-detector 120. Likewise, hardware, software, and/or firmware may be utilized to properly make the appropriate calculations. For example, a personal computer may be configured to process the signals received from the photo-detector 120 in data that is compiled and calculated to produce the absolute distance. A relatively simple digital signal processor (DSP) or an application specific integrated circuit (ASIC) may be utilized to perform the calculations. The processor 130 may also be capable of making several other calculations and/or perform other functions, such as calibration, laser intensity normalization, digital filtering, and signal conditioning.

The microinterferometer 100 can measure the absolute and/or relative distance, i.e. the absolute and/or relative gap thickness, to a target surface 10 as well as can be tuned for optimum sensitivity. Preferably, the reflectivity of the target surface 110 would be in the range of 0.5 to 1. It should be noted, however, that the reflectivity of the target surface 110 may be dependent on the wavelength of the incident light beam 101. In which case, the light source 140 may be selected so that a light beam 101 with a particular wavelength is emitted such that the reflectivity of the target surface 110 is highest. The addition of focal depth perception that comes in focusing the diffracted incident light beam 101, allows the microinterferometer 100 to measure absolute distance. To that, the focusing also increases the lateral resolution of the microinterferometer 100.

It should be noted, that other embodiments of the microinterferometer 100 can be utilized. For example, a focusing element such as the lens 154 may be removed from the microinterferometer 100. In this case, only relative distance measurements can be made. In other embodiments, the reflective diffraction grating 256 may be formed directly on the substrate 152 and may not be tunable. In this case, the electrode 180 may be excluded as well as the controller 170. In these embodiments, the microinterferometer 100 may not be tuned for optimum sensitivity.

In operation, the incident light beam 101 is emitted from the light source 140. In this embodiment, the diffraction grating 156 is formed on the front planar surface of the transparent substrate 152. The reflective diffraction grating 156 reflects a first portion 104 of the incident light beam 101. A second portion 102 of the incident light beam 101 is diffracted upon transmission through the diffraction grating 156 and illuminated through the transparent substrate 152. Higher order diffracted light beams 103, such as the $5^{th}$ and $7^{th}$ order light beams are diffracted and will subsequently reflect off the target surface 110 and be lost.

The second portion 102 of the incident light beam 101 is focused to a particular focal distance, as determined by the lens 154. The depth perception gained with focusing helps determine the absolute distance by, generally, placing a bell-shaped distribution over the periodic $\cos^2(2\pi d/\lambda)$ and/or $\sin^2(2\pi d/\lambda)$ functions described in relation to FIG. 3. The main intensity lobe of the bell-shaped distribution may have a 3 dB width of about $\lambda/2$. This results in is a resolution of around 0.3 µm for a HeNe laser used as the light source 140. In reality, a bell-shaped curve would be a result of the focal depth gained from the lens 154 when the photo-detector 120 was placed a sufficient distance behind the diffraction grating 156. In practice, however, the photo-detector 120 would typically be placed much closer to the diffraction grating 156, e.g. 1 mm, so a true bell-shaped distribution may not be realized. The curve that would result, however, is still a known and determinable function of the absolute distance.

The second portion 102 of the incident light beam 101 is reflected off of the target surface 110 and returns in the direction of the microinterferometer 100. The photo-detector 120 is positioned to receive the first portion 104 and the reflected second portion 102 which have been combined to form an interference pattern due to the phase shift in the light waves caused by the difference in traveled distance. The processor 130 can then process and calculate absolute distance by counting the intensity cycles of the interference pattern. The intensity curve has a periodicity of $\lambda/2$, and so the distance from a reference depth can be found with an accuracy of $\lambda/2$. The reference depth can be decided from the intensity versus depth profile of the lens 154. For example, the point where the peak intensity is reduced by 10% can be taken as the reference depth.

The resolution can be further improved considering the slope of each intensity cycle, yielding distance measurements with sub-nanometer resolution. For absolute distance measurement resolution better than $\lambda/2$, the variation of the intensity within each interference cycle can be used. In this case, the information shown in FIG. 3 may be used to convert intensity variations to distance.

As mentioned earlier, the sensitivity for relative distance measurements, such as vibrations, etc. of the target surface 110 can be maximized at certain distances from the target surface 110. In the example given, distances of odd integer multiples of $\lambda/8$ produce maximum sensitivity. Upon receiving the interference pattern 104, data can be processed by the processor 130 to determine the absolute distance to the target surface 110. With the absence of the lens 154, only relative distance can be measured. Regardless, this information can be provided to the controller 170 to properly adjust the position of the diffraction grating fingers 159 by electrostatic actuation. By adjusting the position of the fingers 159, the distance between the diffraction grating 156 and the target surface 110 can be altered and set to an odd multiple of $\lambda/8$. The concept of electrostatic actuation will be discussed in further detail in subsequent figures.

The microinterferometer 100 can, therefore, provide absolute and/or distance measurements with high resolution. To that end, the bandwidth of the microinterferometer 100 is limited by the processing capabilities of the electrical components, hardware, software, etc., of the processor 130. Another advantage may be considered to be the extremely small size of the microinterferometer 100. Of most concern, generally, is the longitudinal dimension, which in this embodiment is approximately 500 µm, but may be anywhere in the range of 100 µm–1000 µm, from the front of the lens 154 to the photo-detector 120. It should be noted, that this is one example, and the longitude distance can vary greatly with the particular components utilized, the configuration utilized, and the general implementation. The lateral dimension can be relatively small as well. The longest element may be the substrate 152, which may be only slightly longer than the diffraction grating 156 and/or lens 154, which can vary in range, but typically would be on the order of $10\lambda$–$1000\lambda$. This allows for the possibility of mounting several microinterferometers 100 into an array or matrix structure which can greatly increase the speed at which profiling can be performed by covering more area of the target surface 110.

Figure 5:
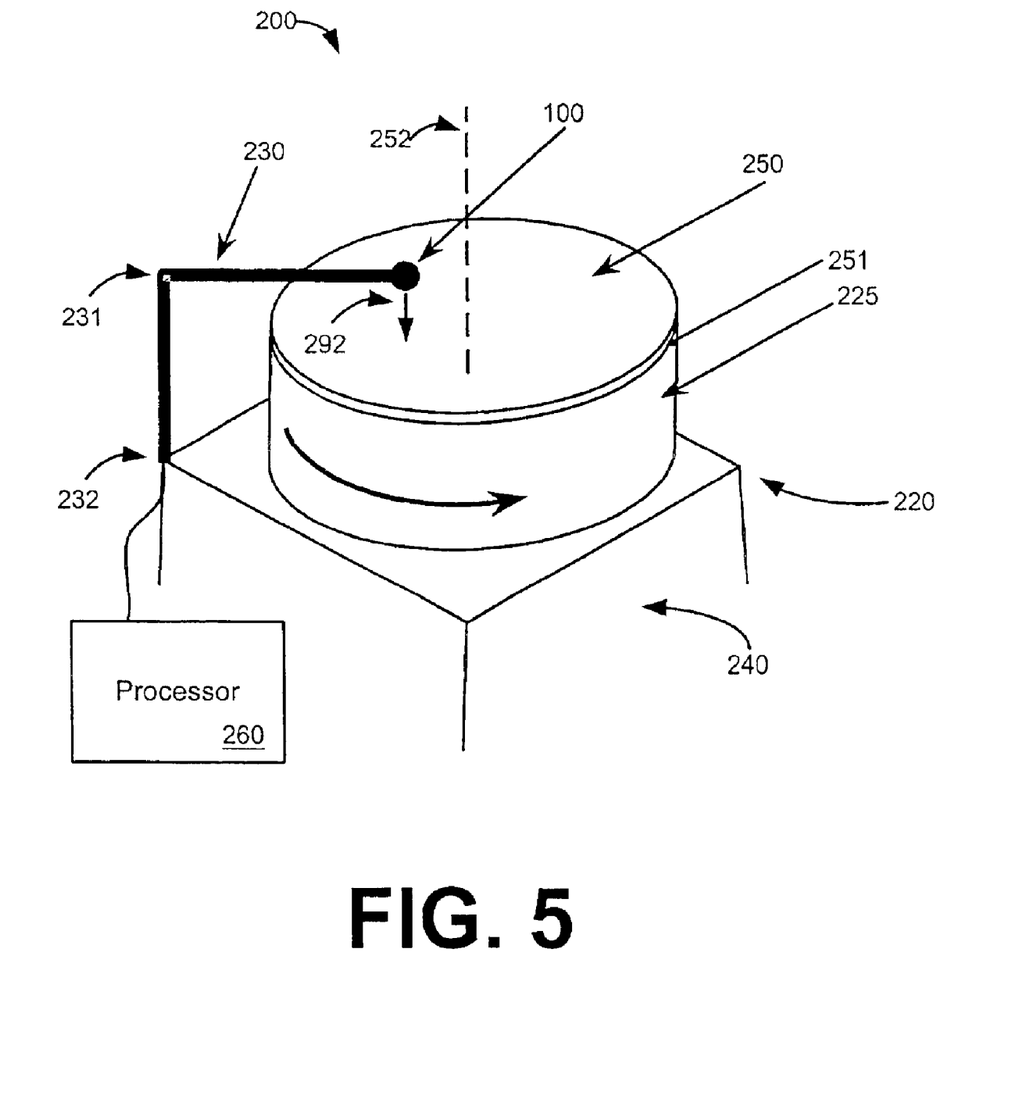
FIG. 5 is a diagram illustrating an embodiment of a surface profiling system in accordance with the present invention.

FIG. 5 is a diagram illustrating an embodiment of a surface profiling system 200 in accordance with the present invention. In this embodiment, the surface profiling system 200 includes an optical sensor which is the microinterferometer 100 discussed in FIG. 4. The microinterferometer 100 is positioned above a target surface 250 that is mounted on a high-speed, high precision motion system 220. A stage to move the target surface 250 with respect to the microinterferometer 100, which in this embodiment is a rotary stage 225 of the motion system 220, may be located on a base 240 of the system 220. The base 240 may be configured to isolate the stage 225 from any other surfaces, particularly in the way of any outside vibrations.

The microinterferometer 100 may be judiciously positioned at a predetermined height above the surface 250. The microinterferometer 100 may remain suspended by an actuating arm 230, or gantry. A processor 260 may be coupled to the microinterferometer 100 as well as the actuating arm 230 and the rotary stage 220. In this embodiment, a light source 140 for the microinterferometer 100 may be located remotely and an optical fiber, although not shown, may provide the incident light beam to the microinterferometer 100. Likewise, the photo-detector 120 of the microinterferometer 100 may be located remotely and may be coupled to the microinterferometer 100 by way of another optical fiber. The photo-detector 120 may then be electrically coupled to the processor 260.

As mentioned, the microinterferometer 100 is similar to that discussed in FIG. 4 and can be configured in a number of ways as discussed previously. For example, the microinterferometer 100 may or may not include a focusing element such as a lens 154 which could provide for absolute distance measurements to the surface 250. The surface profiling system 200 may be fully functional with only relative distance measured from the microinterferometer 100 without the lens 154 as well. Likewise, the microinterferometer 100 diffraction grating 156 may or may not be tunable. The remoteness of the light source 140 may be helpful as it typically is a bulky instrument. An optical fiber provides for flexibility in the position of the microinterferometer 100 and allows it to move relatively easily. In other embodiments, a surface emitting laser formed on a silicon substrate may be utilized as the light source and can be mounted above the diffraction grating. The photo-detector 120 may be positioned on the silicon substrate as well. The microinterferometer 100 may be placed at a position that is commensurate with its range, which may vary by its configuration, its light source, and other factors. A line of sight 292 of the microinterferometer 100 may be directed downward at a direction normal to the target surface 250.

The motion system 220 may be an ultra-high precision air bearing spindle or a precision stepper stage system. The motion system 220 may include the rotary stage 225 in which the target surface 250 may be mounted. Typically, the target surface 250 may be a surface of a wafer. The rotary stage 225 may hold the target object 251 in a number of ways. For example, the target object 251 may be mounted on a spindle. In other alternative embodiments, the target object 251 may be directly mounted on the rotary stage 225. The operation of the motion system 220 may be controlled by the processor 260 or may be operated by a controller (not shown) that is remote from the processor 260, in which case the controller may be coupled to the processor 260.

The actuating arm 230 may be constructed in a variety of ways. In operation, the actuating arm 230 may vary the position of the microinterferometer 100 relative to a central axis 252 of the target surface 250. The actuating arm 230 may be configured to move the microinterferometer 100 radially away from the central axis 252 of the target surface 250 in a linear direction sliding along a first pivot point 231. In other embodiments, the actuating arm 230, may be configured to move the microinterferometer 100 in an arc shape as rotation of the arm 230 may be conducted about a second pivot point 232.

The actuating arm 230 may be configured to move the microinterferometer 100 in a number of actuation methods that are well known in the art. It should be noted, many other methods of moving the microinterferometer 100 relative to the target surface 250 may be utilized. For example a dual arm operation that can traverse over top the targeting surface 250 in an x-y coordinate system may be utilized. Other means can be utilized such as a swing arm that is typically used on a hard drive in a computer where the sensors are located on a rotary arm and actually swing over the part in a circular trajectory (in much the same matter as the needle of a record player moves across a record).

In operation, the rotary stage 225 may rotate the target object 251 about the central axis 252 as the microinterferometer 100 continuously makes measurements of distance to the target surface 250. The measurements are continuously provided to the processor 260. As the rotary stage 225 is rotating, the actuating arm 230 may appropriately move the microinterferometer 100 radially. In this manner, the entire area of the target surface 250 may be mapped. Once the measurements have been made and provided to the processor 260, several functions and calculations can be performed. The speed at which the surface 250 may be mapped may not be limited to the bandwidth of the sensor, i.e. the microinterferometer 100, as in most applications. Rather, the limitations may come from the inertial effects of the surface profiling system 200. For example, any imbalance in the rotary stage 225 may cause vibrations in the system 200 at higher rotational velocities that will be detected by the microinterferometer 100 resulting in degradation of the measurements. Changes in direction for linear scanning systems may have similar, albeit more substantial effects. In any case, the microinterferometer 100 bandwidth may not be the limiting factor in the inspection speed. Thus, if inertial disturbances (e.g., vibrations) generated by moving the microinterferometer 100 relative to the target surface 250 can be reduced, the microinterferometer 100 can take advantage of that reduction.

The processor 260 may be similar to that of processor 60 as described in relation to FIG. 4. The processor 260 may also be configured to store in a memory element, the many measurements made from the microinterferometer 100. From the measurements made, the surface 250 may be profiled with calculations, such as flatness. For example, in calculating flatness of the target surface 250, a minimum and a maximum distance can be found, and the difference may be found to be the flatness. The processor 260 may be capable of doing this in real time and/or can store all the measurements, as mentioned, in a memory element, and then make appropriate calculations. In other examples, the stored measurements may be processed into distance measurements, stored in memory elements, and then used to profile the surface 250 with surface characteristics, such as roughness, waviness, and form errors. The processor 260 may also have the capability to control the actuation of the actuating arm 231 and/or the rotary stage 225.

In other embodiments, a high precision linear motion stage may be utilized in place of the rotary stage 225. In this case, the linear motion stage upon working concurrently with the actuating arm 230 can assure the entire area of the target surface 250 is measured, in this case, in an x-y coordinate manor. This may be advantageous for target objects that are not circular in nature.

Figure 6A:
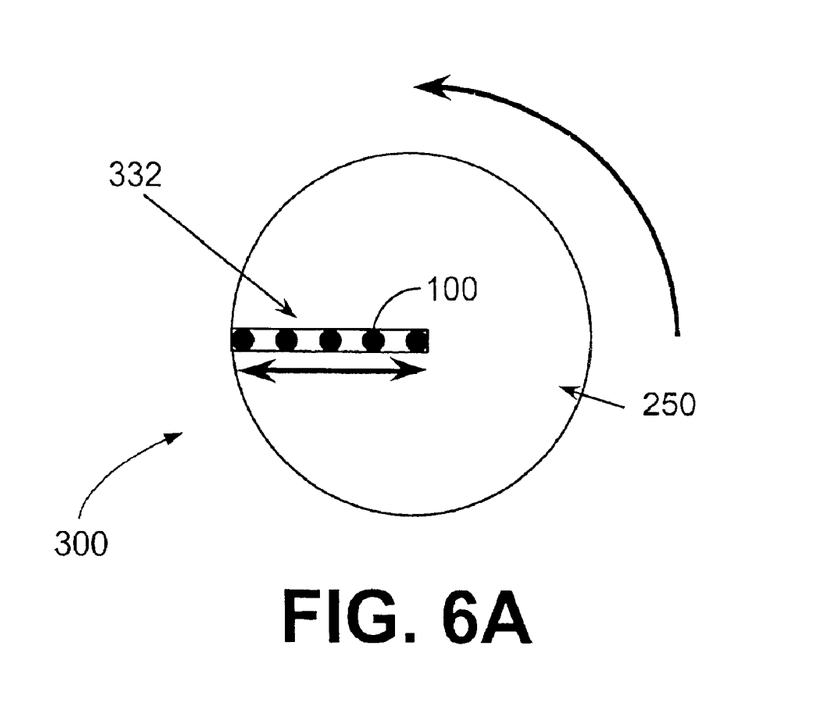
FIG. 6A is a diagram illustrating another embodiment of a surface profiling system in accordance with the present invention.
Figure 6B:
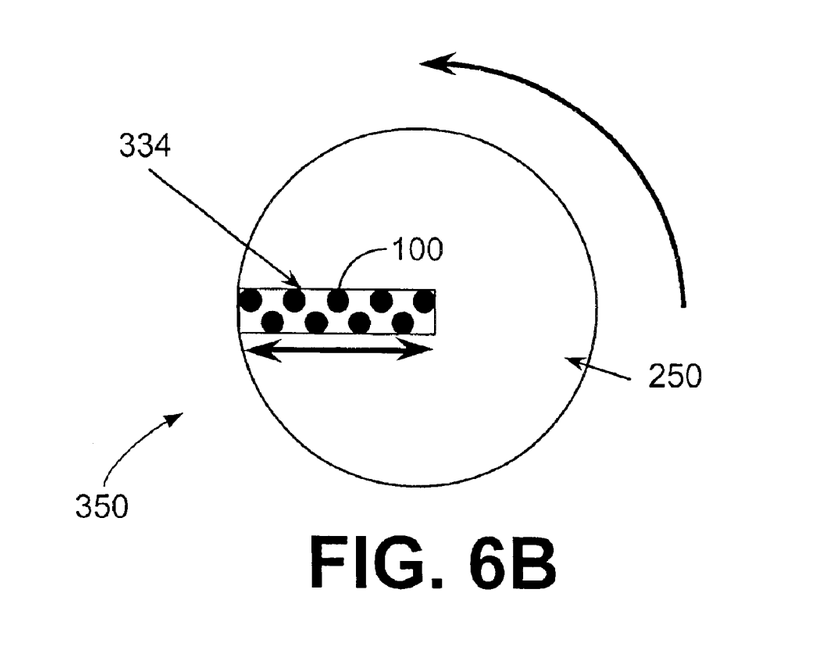
FIG. 6B is a diagram illustrating yet another embodiment of a surface profiling system in accordance with the present invention.

FIGS. 6A and 6B illustrate other embodiments of a surface profiling system 300 and 350, respectively, in accordance with the present invention. Both FIGS. 6A and 6B show a top view of their respective system. The surface profiling system 300 of FIG. 6A utilizes an optical sensor 332 that includes a one dimensional (1-D) array of microinterferometers 100 similar to those discussed in FIG. 5 operating in parallel. In this embodiment, the array of microinterferometers 100 can greatly decrease the time in which it takes to measure the target surface 250, provided enough bandwidth is available to process the results of the multiple microinterferometers 100. For example, assume the radius of the target surface 250 to be 100 mm. In this case, 1000 microinterferometers 100 can be placed at a distance of 100 μm apart thus covering the area of the target surface 250 in a radial direction. The time it takes for appropriate measurements to be made is now the time it takes for the target surface 250 to rotate 360°. This would vary with the desired resolution of the outermost microinterferometer 100. The greater the desired rotational resolution, the slower the target surface 250 may rotate, assuming the processing speed of the microinterferometer 100 and processor (not shown) was fixed. This, as compared to the system 100 of FIG. 5, can be much quicker.

FIG. 6B displays another embodiment of a surface profiling system 350, upon which more improvements have been made. In this embodiment, a 2-D staggered array of microinterferometers 100 may be included within the sensor 334. This can increase the radial resolution of the system 350 by a factor of two.

The array of microinterferometers 100 can, generally, be produced with relative ease, as many microinterferometers 100 can share a common substrate 30. Although only a handful of microinterferometers 100 are displayed in both figures, many more can be placed in the optical sensor 332 and 334, respectively. This can be accomplished because of the relatively small lateral size of each microinterferometer 100 which may be on the order of 10–12 times the wavelength of the incident light beam.

In both cases the optical sensors 332 and 334 may be configured to move relative to the target surface 250 in much the same manner as that described in FIG. 5, or using a radial swing arm as in a typical computer hard drive unit. Likewise, the optical sensors 332 and 334 may be able to move non-radially, as well.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A system for profiling a surface of an object, the system comprising:
an optical sensor comprising an optical microinterferometer positioned about the surface for measuring the distance between a reference point of said optical microinterferometer and the surface; and
means for varying the position of the object relative to a diffraction grating of said optical microinterferometer.

2. The system of claim 1, further comprising means for determining the profile of the surface from measurements made by said optical microinterferometer.

3. The system of claim 2, wherein said means for determining the profile comprises means for calculating the flatness of the surface.

4. The system of claim 1, further comprising means for holding the object surface.

5. The system of claim 1, wherein said optical microinterferometer is configured to measure the relative distance to the surface.

6. The system of claim 1, wherein said optical microinterferometer is configured to measure the absolute distance to the surface.

7. The system of claim 1, wherein said means for moving comprises means for rotating the object about an axis positioned parallel to a line of sight of said optical microinterferometer.

8. The system of claim 7, further comprising means for moving said optical sensor in a radial direction orthogonal to the direction of the object induced by said means for rotating.

9. The system of claim 1, wherein said means for varying comprises means for moving the object substantially linearly in a direction orthogonal to a line of sight of said optical microinterferometer.

10. The system of claim 1, further comprising means for moving said optical sensor relative to the object.

11. The system of claim 1, wherein said optical sensor further comprises an array of optical microinterferometers.

12. The system of claim 11, wherein said array of optical microinterferometers is configured to measure the distance between a reference point of each of said optical microinterferometers and the surface, in parallel.

13. The system of claim 1, wherein said optical microinterferometer comprises a phase-sensitive reflective diffraction grating.

14. The system of claim 13, wherein said phase-sensitive reflective diffraction grating is configured to be tunable.

15. The system of claim 13, wherein said optical microinterferometer further comprises a means for focusing to provide focal depth to said optical microinterferometer for measuring absolute distance.

16. A method for profiling a target surface of an object, the method comprising:

illuminating the target surface with an incident light beam through a phase-sensitive, reflective diffraction grating, such that a first portion of the incident light beam is reflected and a second portion of the incident light beam is diffracted upon being transmitted through the diffraction grating;

receiving interference patterns produced from the first portion of he incident light beam reflected from the diffraction grating interfering with the second portion of the incident light beam reflected from the target surface;

measuring the intensity of the interference patterns to determine the distance between a reference point and the surface;

varying the position of the object relative to the diffraction grating; and processing the measured distances to profile the surface of the object.

17. The method of claim 16, wherein the measured distance to the surface is a relative distance.

18. The method of claim 16, wherein the measured distance to the surface is an absolute distance.

19. The method of claim 16, wherein varying the position comprises rotating the object about a central axis.

20. The method of claim 16, wherein varying the position comprises moving the object in a substantially linear direction.

* * * * *

UNITED STATES PATENT AND TRADEMARK OFFICE
CERTIFICATE OF CORRECTION

PATENT NO.        : 7,068,377 B2                                          Page 1 of 1
APPLICATION NO.   : 10/113362
DATED             : June 27, 2006
INVENTOR(S)       : Degertekin et al.

It is certified that error appears in the above-identified patent and that said Letters Patent is hereby corrected as shown below:

TITLE PG. ITEM (73) the Assignee listed should read:

-- Georgia Tech Research Corporation --.

Column 14, line 45, the claim listed should read:

-- 7. The system of claim 1, wherein said means for varying comprises means for rotating the object about an axis positioned parallel to a line of sight of said optical microinterferometer. --

Signed and Sealed this

Third Day of October, 2006

JON W. DUDAS
*Director of the United States Patent and Trademark Office*